Figure 1:
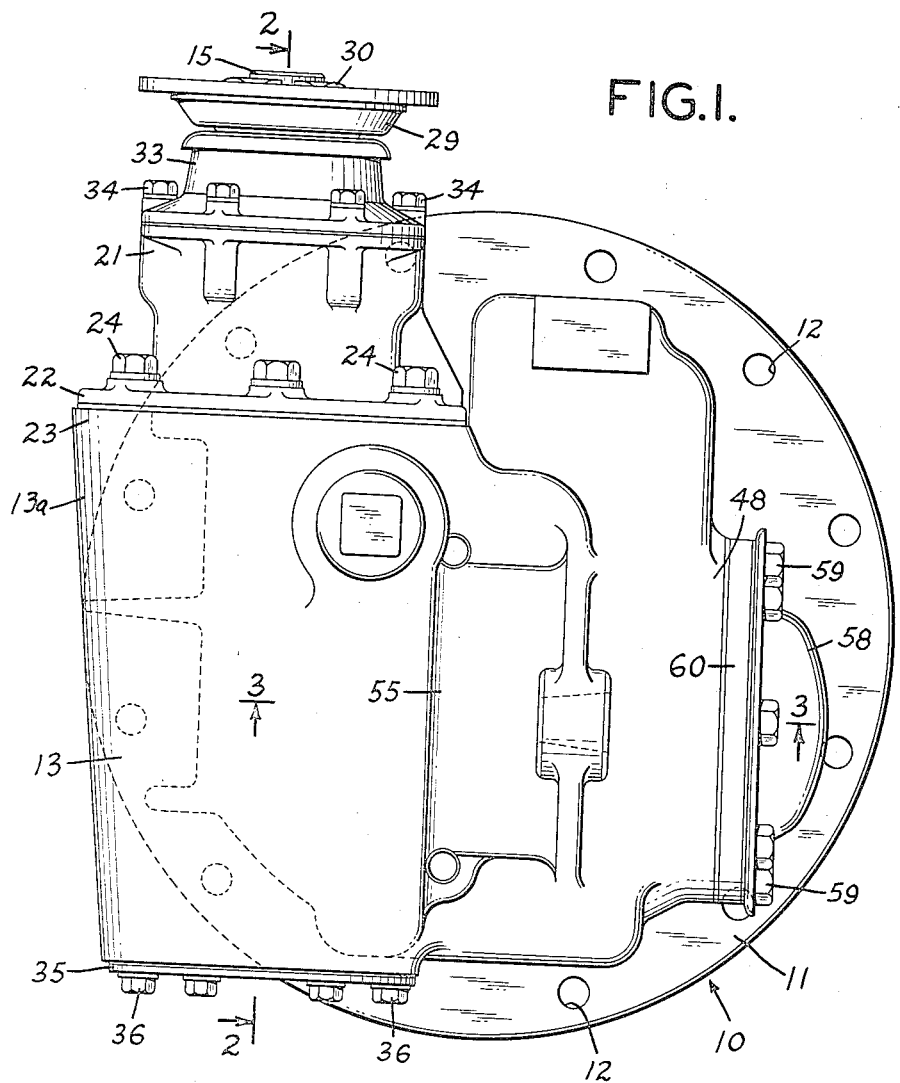

United States Patent Office 2,731,855
Patented Jan. 24, 1956

2,731,855

REAR AXLE CARRIER UNIT

Alois H. Schmal, Westfield, N. J., assignor to Mack Manufacturing Corporation, New York, N. Y., a corporation of Delaware Application February 10, 1951, Serial No. 210,410

4 Claims. (Cl. 74—606)

This invention relates to improvements in rear axles for single or dual rear axle vehicles and it relates more particularly to a gear carrier unit and housing to support the reduction gear and differential of such a rear axle unit.

In the dual rear axle type of truck or bus in which the axles are mounted in tandem, the cross-shaft to transmit power to the first, or front, rear axle is usually designed with the bevel gear overhanging or above the differential mechanism to permit the inter-axle drive shaft to pass through the housing. The normal design of the carrier housing for the cross-shaft and drive shaft provides a large, separate opening for assembly of the cross-shaft with the bevel gear. Inasmuch as openings must be provided for the inter-axle drive shaft and for the drive gearing between the cross-shaft and the differential, the provision of another large opening for the assembly of the cross-shaft with the bevel gear tends to weaken the carrier housing excessively. To overcome this weakness, the walls of the housing must be increased in thickness and the cover plates and bearing supports must be increased in size and weight to strengthen them and improve their rigidity. As a result, the weight of the carrier unit is greatly increased. Also, difficulties are encountered in preventing leakage of lubricant from the housing and in assembling and disassembling the parts for servicing because of the great weight of the carrier unit.

The present invention relates to an improved carrier housing, reduction gear and differential assembly whereby the weight of a unit including those elements can be substantially decreased and the over-all rigidity of the housing substantially improved.

More particularly, the carrier housing embodying the present invention is so constructed and arranged that the cross-shaft having a bevel gear and a drive gear member thereon can be inserted into the housing from below through the opening which is required to connect the reduction gear on the cross-shaft to the differential mechanism. This arrangement permits a relatively small opening to be used in the side of the carrier housing instead of the large opening required heretofore. Because this opening is relatively small, it can be closed by a thin sealing cap construction of markedly less weight than the heavy cover plate used heretofore without sacrifice of rigidity or strength of the housing.

The cross-shaft, after insertion in the housing, is retained in position by means of a split bearing support which enables easy assembly and disassembly of the unit.

To further facilitate and secure the several elements of the unit in their assembled relation, the carrier housing may also be provided with split bearing supports in which the differential mechanism is mounted as a unit so that the drive shaft, cross-shaft and differential mechanism can be attached to and detached from the axle housing as a unit.

Figure 2:
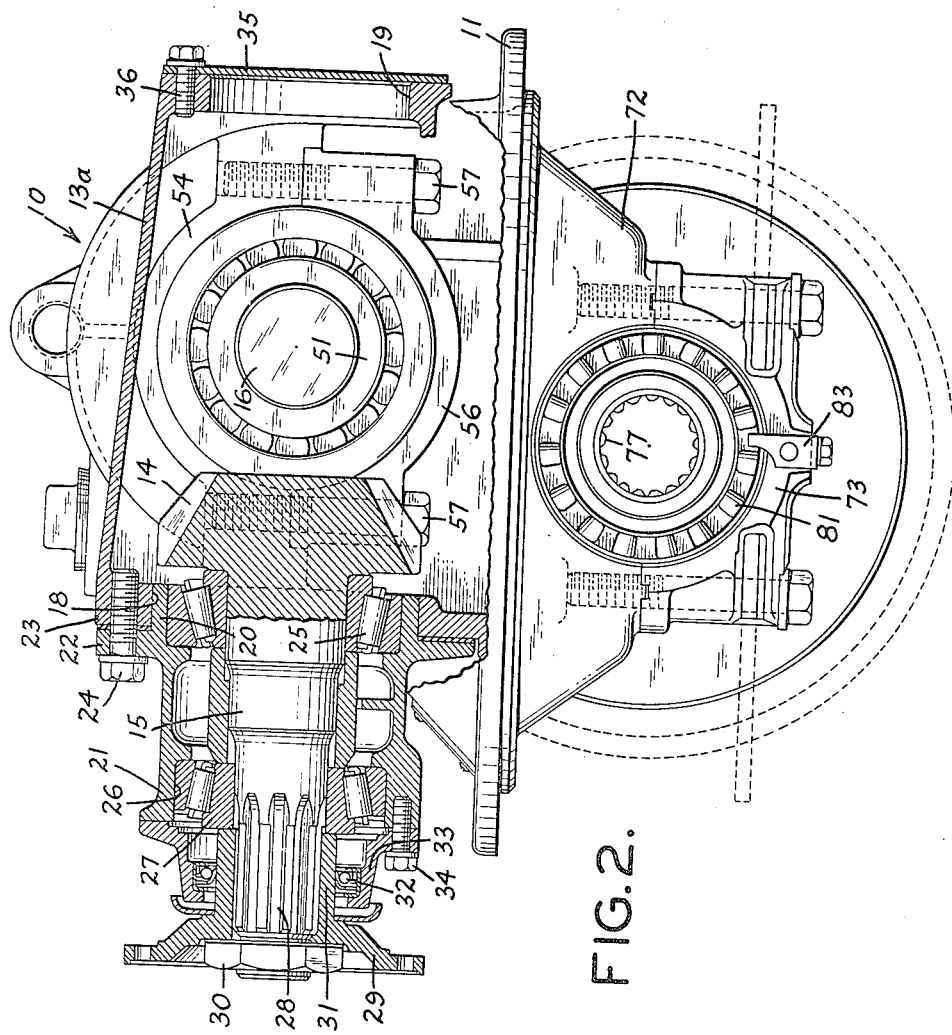
Figure 3:
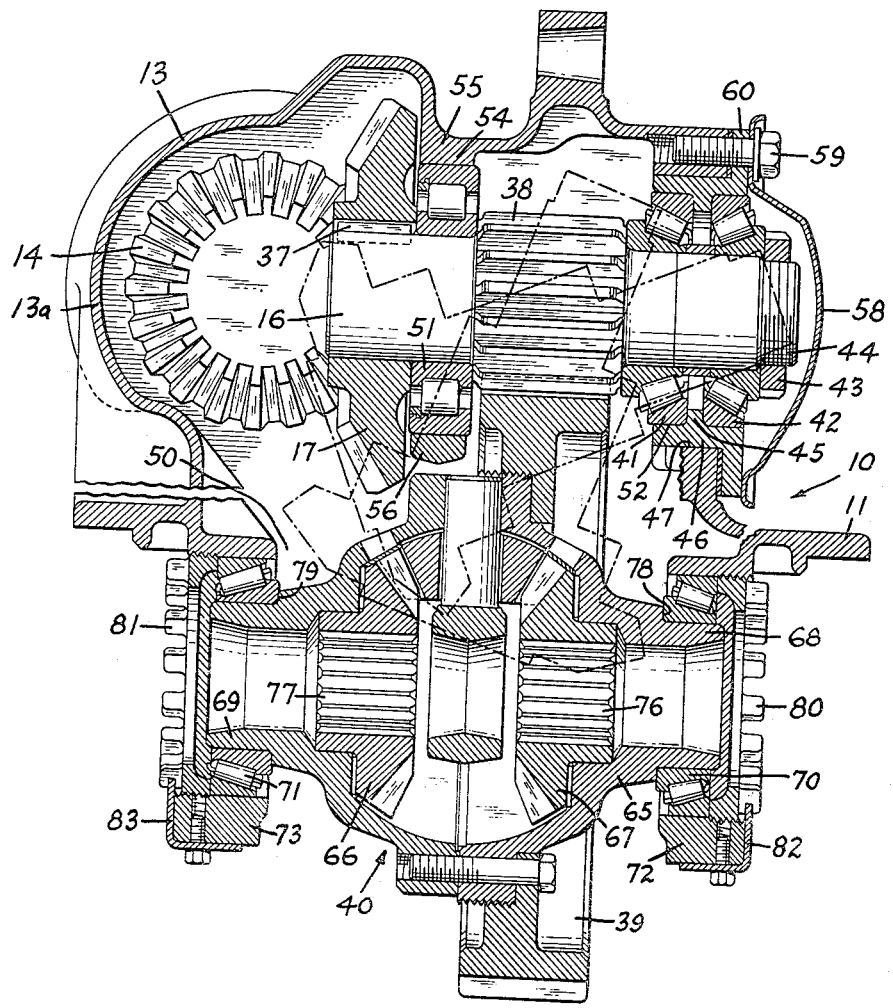

For a better understanding of the present invention, reference may be had to the accompanying drawing in which:

Figure 1 is a plan view of a typical carrier unit embodying the present invention;

Figure 2 is a view in section taken on line 2—2 of Figure 1 with one of the gears omitted to disclose details of construction; and Figure 3 is a view in section taken on line 3—3 of Figure 1 with one of the gears omitted to disclose details of construction; and Figure 3 is a view in section taken on line 3—3 of Figure 1 with one of the bevel gears omitted to disclose the bearing support behind it.

The form of the invention illustrated in the drawings is a unit intended for use on the rear drive axle or on a single drive axle for a truck or similar heavy duty vehicle. The housing 10 of the unit includes a circular base flange 11, best shown in Figure 1, which is adapted to be received on top of the axle housing, not shown, and secured thereto by means of bolts or screws passing through the apertures 12 around the periphery of the base flange 11.

The base flange carries as a part of the housing an upstanding hollow dome portion 13 having a tapered generally frusto-conical portion 13a which receives the bevel gear 14 on the axle drive shaft 15. The cross-shaft 16 is mounted generally perpendicular to the axis of frusto-conical portion 13a and carries the bevel gear 17 forming the first stage of a dual reduction drive system. The housing portion 13a has the openings 18 and 19 at its opposite ends. The opening 18 which is generally circular receives the inner annular flange 20 on a bearing support 21 for the drive shaft 15. The support 21 is generally circular in cross-section and has a radially extending base flange 22 which abuts against the rim 23 around the opening 18 to which it is secured by a plurality of machine screws 24.

The inner flange 20 supports an anti-friction bearing 25 which has its inner race mounted on the drive shaft 15 adjacent to the bevel gear 14. The opposite end of the housing 21 has an internal recess 26 in which is mounted another anti-friction bearing 27 for supporting the opposite end of the shaft 15 adjacent to the splines 28 thereon. The splines mesh with complemental splines on a drive shaft connector 29 of disc-like form which is secured by means of a nut 30 on the end of the shaft. The disc member has an inwardly extending sleeve 31 thereon which is engaged by an oil or grease seal 32 of conventional type carried by an annular member 33 which is secured to the outer end of the housing 21 by means of a plurality of screws 34. The above described mounting for the drive shaft 15 and the bevel gear 14 may be modifid in accordance with requirements.

While the bevel gear 14 is shown as mounted on the end of the shaft 15, it will be understood that the shaft may extend beyond the gear 14 through the opening 19 at the opposite end of the housing portion 13 to drive a second axle in tandem. When the opening 19 is not in use it can be closed by means of a cover plate 35 secured to the end of the housing portion 13 by means of a plurality of screws 36. If desired, the opening 19 can be omitted entirely in a carrier housing for a simple drive axle or in the rear rear axle of a dual axle vehicle.

Referring to Figure 3, the bevel gear 14 meshes with the bevel gear 17 which is secured by means of a key 37 or its equivalent to the inner end of the cross-shaft 16. The cross-shaft 16 carries at about its mid-portion a small drive gear 38 which may be a spur or spiral gear type which drives a larger gear 39 mounted on a differential mechanism 40. Inasmuch as in the embodiment of the invention disclosed, the bevel gear 14 is smaller than the bevel gear 17 and the drive gear 38 is smaller than the differential gear 39, a double reduction in ratio is obtained.

The principal features of the carrier unit disclosed herein are the mounts for the cross-shaft 16 and the differential 40. As illustrated in Figure 3, the righthand end of the shaft 16 carries opposed roller bearings 41 and 42. The outermost bearing 42 is secured on the outer end of the shaft 16 by means of a nut 43 threaded on the threaded end 44 of the shaft 16. This bearing abuts against an inwardly extending flange 45 on a bearing support ring 46 which is mounted in an opening 47 in a substantially flat and vertically disposed side wall 48 of the housing 10. This opening 47 is only of a size sufficiently large to receive the supporting ring 46. The outermost bearing 42 must, of course, be attached to the end of the shaft 16 from the outside of the casing to limit the inward movement of the shaft 16.

As indicated before, it is desirable to keep the number and size of the openings in the housing 10 to a minimum to avoid the excessive reinforcing of the casing and the use of heavy, rigid cover plates for the openings in the casing. Therefore, the opening 47 is not large enough to permit the shaft 16 and the bevel gear 17 thereon to be inserted through it or assembled conveniently after insertion of the shaft 16 through the opening. To enable easy insertion of the shaft 16 and the gear 17 into the casing, it is provided with a relatively large opening 50 in its base inside the flange 11. This opening, before the differential mechanism 40 is assembled on the bottom of the housing, is large enough to permit the cross-shaft 16 with the bevel gear on it to be inserted into the housing. The pre-assembled cross-shaft with the bearing 41, the gear 38, the bevel gear 17 and the roller bearing 51 in assembled relation thereon is inserted through the opening 50 and tilted into a position to engage the bearing 41 in the inner recess 52 of the bearing support ring 46 as shown in the dotted line positions in Figure 3. When the shaft has been inserted through the ring 46, the outer bearing 42 may be assembled as described above, thereby supporting the outer end of the shaft 16.

The bearing 51 which is positioned between the bevel gear and the drive gear 38 is received in an upper arcuate split bearing support 54 extending downwardly from the top 55 of the carrier housing. The bearing 51 is then secured in position by means by the semi-circular lower half 56 of the split bearing support which is secured to the upper bearing support section 54 by means of the screws 57, as shown in Figure 2. In this way, the cross-shaft and gear assembly can be easily inserted into and removed from the carrier housing as a unit.

The outer end of the shaft 16 and the outermost bearing 42 thereon are covered by means of a thin or sheet steel domed cap 58 which is held in position by means of a plurality of screws 59 extending through the rim of the cap 58 and the flange 60 on the bearing support 46 and into the housing 13 as shown in Figure 2.

After assembly of the drive shaft and cross-shaft, the differential mechanism 40 is then secured in position. The differential mechanism 40 is generally conventional having a housing 65 in which are mounted the several differential pinions, spider and the bevel gears 66 and 67. The housing 65 has laterally extending sleeve portions 68 and 69 on which are mounted tapered roller bearings 70 and 71. The roller bearings are supported in split bearing supports 72 and 73, the upper halves of which are integral with the housing 10 and disposed within the perimeter of the flange 11 so that the differential can be lowered into the axle housing to receive the axle shafts in the splined openings 76 and 77 respectively of the bevel gears 67 and 66. The bearings 70 and 71 are positioned against shoulders 78 and 79 on the differential housing by means of castellated externally threaded nuts 80 and 81 threaded into the split bearings 72 and 73 respectively. The nuts 80 and 81 are retained in adjusted position by means of locking keys 82 and 83 of L-shaped form secured to the lower halves of the split bearing supports 72 and 73.

The above described housing for the carrier unit has a minimum of openings through its side walls and these openings are kept to such a small size, even in a heavy duty installation, that the casing does not need excessive reinforcement or thick walls to enable it to withstand the stresses exerted on it even in heavy duty service. Actually the stresses in either forward or reverse drive are concentrated well within the housing so that bending or displacement stresses are kept at a relatively low level.

Despite the relatively small size of the openings in the housing, assembly of the cross-shaft in the housing is very easy and all adjustments and fitting of elements together can be accomplished either from the exterior of the housing or through the large opening in the bottom of the housing.

It will be understood, of course, that the size of the various shafts, gears and the like and their ratios are susceptible to considerable modification and that the shape or design of the housing may be modified to accommodate the various changes referred to above. Therefore, the form of the invention described above should be considered as illustrative and not as limiting the scope of the following claims.

I claim:

1. A rear axle carrier housing having angularly related front and side walls, a top wall and a base flange to secure the housing to an axle housing, said carrier housing having openings in said front wall and in one of said side walls, and a bottom opening within the perimeter of said flange, a bearing for receiving a drive shaft detachably mounted in the opening in said front wall, bearing means mounted in the opening in said side wall to detachably receive one end of a reduction shaft having a gear thereon, a semi-circular bearing support fixed to and extending downwardly from the top wall of said carrier housing, a semi-circular bearing retainer detachably connected to said semi-circular bearing support to form therewith a ring for receiving a bearing on said reduction shaft and holding it in alignment with said bearing means, said bottom opening being sufficiently large to enable the reduction shaft and the gear and bearing thereon to be inserted as a unit into said housing through said bottom opening into engagement with said bearing means and into said bearing support, said retainer releasably holding said bearing in said bearing support and holding said shaft in said bearing means and in said housing, said housing being devoid of openings, other than the bottom opening, large enough to admit said reduction shaft gear and bearing thereon as a unit into said carrier housing.

2. The carrier housing set forth in claim 1, comprising means extending outwardly from the carrier housing from within said base flange to detachably receive and support a differential mechanism thereon.

3. The carrier housing set forth in claim 1, in which said housing has another opening in a wall opposite to and in alignment with the opening in said front wall to permit a drive shaft to extend through the opening in the front wall and said another opening.

4. The carrier housing set forth in claim 1, comprising separable split ring bearing support members fixed to and extending from said housing on opposite sides of said bottom opening to receive and support a differential mechanism rotatably, said bearing support members being separable to enable said differential mechanism to be detached from said housing.

(References on following page)

References Cited in the file of this patent

UNITED STATES PATENTS

| | | |
|---|---|---|
| 1,242,803 | Herreshoff | Oct. 9, 1917 |
| 1,442,498 | Sternberg | Jan. 16, 1923 |
| 1,476,675 | Mooers | Dec. 4, 1923 |
| 1,487,563 | Hawley | Mar. 18, 1924 |
| 1,493,175 | Wolf | May 6, 1924 |
| 1,906,613 | Keese | May 2, 1933 |
| 1,944,612 | Repeck | Jan. 23, 1934 |
| 2,069,411 | Keese | Feb. 2, 1937 |
| 2,360,521 | Sheppard | Oct. 17, 1944 |
| 2,581,123 | Merkle | Jan. 1, 1952 |
| 2,600,912 | Olson | June 17, 1952 |

FOREIGN PATENTS

| | | |
|---|---|---|
| 603,703 | Great Britain | June 21, 1948 |